(12) United States Patent
Olson et al.

(10) Patent No.: US 12,001,934 B2
(45) Date of Patent: *Jun. 4, 2024

(54) METHOD AND APPARATUS FOR CONSTRUCTING INFORMATIVE OUTCOMES TO GUIDE MULTI-POLICY DECISION MAKING

(71) Applicant: THE REGENTS OF THE UNIVERSITY OF MICHIGAN, Ann Arbor, MI (US)

(72) Inventors: Edwin Olson, Ann Arbor, MI (US); Dhanvin H. Mehta, Ann Arbor, MI (US); Gonzalo Ferrer, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,897

(22) Filed: May 12, 2023

(65) Prior Publication Data

US 2023/0289557 A1    Sep. 14, 2023

Related U.S. Application Data

(63) Continuation of application No. 17/371,221, filed on Jul. 9, 2021, now Pat. No. 11,681,896, which is a
(Continued)

(51) Int. Cl.
*G06N 3/02*   (2006.01)
*G06N 3/008*  (2023.01)
(Continued)

(52) U.S. Cl.
CPC ............. *G06N 3/02* (2013.01); *G06N 3/008* (2013.01); *G06N 3/084* (2013.01); *G06N 7/01* (2023.01); *H04N 1/00002* (2013.01)

(58) Field of Classification Search
CPC ............ G06N 3/02; G06N 7/01; G06N 3/008; G06N 3/084; H04N 1/00002
See application file for complete search history.

(56) References Cited

U.S. PATENT DOCUMENTS

| 5,544,282 A | 8/1996 | Chen et al. |
| 6,199,013 B1 | 3/2001 | O'Shea |

(Continued)

FOREIGN PATENT DOCUMENTS

WO    WO-2015/160900 A1    10/2015

OTHER PUBLICATIONS

D. Mehta et al "Fast Discovery Of Influential Outcomes For Risk-Aware MPDM", Proceedings of the IEEE International Conference on Robotics and Automation (ICRA) (2017).
(Continued)

*Primary Examiner* — Olisa Anwah
(74) *Attorney, Agent, or Firm* — Harness, Dickey & Pierce, P.L.C.

(57) ABSTRACT

In Multi-Policy Decision-Making (MPDM), many computationally-expensive forward simulations are performed in order to predict the performance of a set of candidate policies. In risk-aware formulations of MPDM, only the worst outcomes affect the decision making process, and efficiently finding these influential outcomes becomes the core challenge. Recently, stochastic gradient optimization algorithms, using a heuristic function, were shown to be significantly superior to random sampling. In this disclosure, it was shown that accurate gradients can be computed—even through a complex forward simulation—using approaches similar to those in dep networks. The proposed approach finds influential outcomes more reliably, and is faster than earlier methods, allowing one to evaluate more policies
(Continued)

while simultaneously eliminating the need to design an easily-differentiable heuristic function.

20 Claims, 7 Drawing Sheets

Related U.S. Application Data continuation of application No. 15/923,577, filed on Mar. 16, 2018, now Pat. No. 11,087,200.

(60) Provisional application No. 62/472,734, filed on Mar. 17, 2017.

(51) Int. Cl.
*G06N 3/084* (2023.01)
*G06N 7/01* (2023.01)
*H04N 1/00* (2006.01)

(56) References Cited

U.S. PATENT DOCUMENTS

| | | | |
|---|---|---|---|
| 9,129,519 | B2 | 9/2015 | Aoude et al. |
| 9,274,525 | B1 | 3/2016 | Ferguson et al. |
| 9,495,874 | B1 | 11/2016 | Zhu et al. |
| 9,618,938 | B2 | 4/2017 | Olson et al. |
| 9,646,428 | B1 | 5/2017 | Konrardy et al. |
| 9,720,412 | B1 | 8/2017 | Zhu et al. |
| 9,811,760 | B2 | 11/2017 | Richardson et al. |
| 10,012,981 | B2 | 7/2018 | Gariepy et al. |
| 10,235,882 | B1 | 3/2019 | Aoude et al. |
| 10,248,120 | B1 | 4/2019 | Siegel et al. |
| 10,386,856 | B2 | 8/2019 | Wood et al. |
| 10,540,892 | B1 | 1/2020 | Fields et al. |
| 10,558,224 | B1 | 2/2020 | Lin et al. |
| 10,586,254 | B2 | 3/2020 | Singhal |
| 10,642,276 | B2 | 5/2020 | Huai |
| 10,969,470 | B2 | 4/2021 | Voorheis et al. |
| 11,869,092 | B2 * | 1/2024 | Konrardy .............. B60W 40/09 |
| 2002/0062207 | A1 | 5/2002 | Faghri |
| 2004/0100563 | A1 | 5/2004 | Sablak et al. |
| 2005/0004723 | A1 | 1/2005 | Duggan et al. |
| 2006/0184275 | A1 | 8/2006 | Hosokawa et al. |
| 2006/0200333 | A1 | 9/2006 | Dalal et al. |
| 2007/0193798 | A1 | 8/2007 | Allard et al. |
| 2007/0276600 | A1 | 11/2007 | King et al. |
| 2008/0033684 | A1 | 2/2008 | Vian et al. |
| 2010/0114554 | A1 | 5/2010 | Misra |
| 2012/0089275 | A1 | 4/2012 | Yao-Chang et al. |
| 2013/0141576 | A1 | 6/2013 | Lord et al. |
| 2013/0253816 | A1 | 9/2013 | Caminiti et al. |
| 2014/0195138 | A1 | 7/2014 | Stelzig et al. |
| 2014/0244198 | A1 | 8/2014 | Mayer |
| 2015/0302756 | A1 | 10/2015 | Guehring et al. |
| 2015/0316928 | A1 | 11/2015 | Guehring et al. |
| 2015/0321337 | A1 | 11/2015 | Stephens, Jr. |
| 2016/0005333 | A1 | 1/2016 | Naouri |
| 2016/0209840 | A1 | 7/2016 | Kim |
| 2016/0314224 | A1 | 10/2016 | Wei et al. |
| 2017/0031361 | A1 * | 2/2017 | Olson .................. B60W 40/10 |
| 2017/0072853 | A1 | 3/2017 | Matsuoka et al. |
| 2017/0268896 | A1 | 9/2017 | Bai et al. |
| 2017/0301111 | A1 | 10/2017 | Zhao et al. |
| 2017/0356748 | A1 | 12/2017 | Iagnemma |
| 2018/0011485 | A1 | 1/2018 | Ferren |
| 2018/0053102 | A1 | 2/2018 | Martinson et al. |
| 2018/0082596 | A1 | 3/2018 | Whitlow |
| 2018/0089563 | A1 | 3/2018 | Redding et al. |
| 2018/0183873 | A1 | 6/2018 | Wang et al. |
| 2018/0184352 | A1 | 6/2018 | Lopes et al. |
| 2018/0220283 | A1 | 8/2018 | Condeixa et al. |
| 2018/0268281 | A1 | 9/2018 | Olson et al. |
| 2018/0293537 | A1 | 10/2018 | Kwok |
| 2018/0365908 | A1 | 12/2018 | Liu et al. |
| 2018/0367997 | A1 | 12/2018 | Shaw et al. |
| 2019/0039545 | A1 | 2/2019 | Kumar et al. |
| 2019/0066399 | A1 | 2/2019 | Jiang et al. |
| 2019/0106117 | A1 | 4/2019 | Goldberg |
| 2019/0138524 | A1 | 5/2019 | Singh et al. |
| 2019/0196465 | A1 | 6/2019 | Hummelshoj |
| 2019/0220011 | A1 | 7/2019 | Della Penna |
| 2019/0236950 | A1 | 8/2019 | Li et al. |
| 2019/0258246 | A1 | 8/2019 | Liu et al. |
| 2019/0265059 | A1 | 8/2019 | Warnick et al. |
| 2020/0020226 | A1 | 1/2020 | Stenneth et al. |
| 2020/0098269 | A1 | 3/2020 | Wray et al. |
| 2020/0122830 | A1 | 4/2020 | Anderson et al. |
| 2020/0124447 | A1 | 4/2020 | Schwindt et al. |
| 2020/0159227 | A1 | 5/2020 | Cohen et al. |
| 2020/0189731 | A1 | 6/2020 | Mistry et al. |
| 2020/0233060 | A1 | 7/2020 | Lull et al. |
| 2020/0346666 | A1 | 11/2020 | Wray et al. |
| 2020/0400781 | A1 | 12/2020 | Voorheis et al. |
| 2021/0116907 | A1 | 4/2021 | Altman |

OTHER PUBLICATIONS

D. Mehta et al., "Autonomous Navigation in Dynamic Social Environments Using Multi-Policy Decision Making", Proceedings of the IEEE/RSJ International Conference on Intelligent Robots and Systems (IROS) (2016).

A. Cunningham, et al, "MPDM: Multipolicy Decision-Making in Dynamic, Uncertain Environments for Autonomous Driving" Proceedings of the IEEE International Conference on Robotics and Automation (ICRA) (2015).

J. Straub, "Comparing The Effect Of Pruning On A Best Path and a Naive-approach Bloackboard Solver", International Journal of Automation and Computing (Oct. 2015).

B. Paden et al., "A Survey Of MOtion Planning And Control Techniques For Self-driving Urban Vehicles", IEEE Transactions on Intelligent Vehicles, vol. 1, Iss. 1, (Jun. 13, 2016).

International Search Report and Written Opinion of the ISA dated Oct. 15, 2019 for PCT/US19/42235.

Neumeier Stefan, et al., "Towards a Driver Support System for Teleoperated Driving", 2019 IEEE Intelligent Transportation Systems Conference (ITSC) (Year: 2019).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Japanese Office Action regarding Application No. 201955066.7, dated Jan. 21, 2022.

* cited by examiner

Forward Simulation    Backprop

METHOD AND APPARATUS FOR CONSTRUCTING INFORMATIVE OUTCOMES TO GUIDE MULTI-POLICY DECISION MAKING

CROSS-REFERENCE TO RELATED APPLICATIONS

This application is a continuation of U.S. application Ser. No. 17/371,221, filed on Jul. 9, 2021, which is a continuation of U.S. application Ser. No. 15/923,577, filed on Mar. 16, 2018. This application claims the benefit of U.S. Provisional Application No. 62/472,734, filed on Mar. 17, 2017. The entire disclosures of the above applications are incorporated herein by reference.

GOVERNMENT CLAUSE

This invention was made with government support under Grant No. D13AP00059 awarded by the Defense Advanced Research Projects Agency. The Government has certain rights in this invention.

FIELD

The present disclosure relates to a method for multi-policy decision making of an object moving through an environment.

BACKGROUND

Autonomously controlled objects, such as a robot or vehicle, need to consider their surrounding environment in order to make decisions regarding which direction to pursue. To do this, the controlled object considers all possible scenarios, directions, and outcomes for itself and the objects around them. However, randomly considering each possible scenario is not only computationally expensive, but it is also inefficient as it does not define a method for identifying scenarios where the controlled object may experience collisions or other high-cost occurrences.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

This section provides a general summary of the disclosure, and is not a comprehensive disclosure of its full scope or all of its features.

A computer-implemented method is presented for issuing a command to a controlled object in an environment. A determination is made for each policy from a set of policies, where a policy specifies the command for the controlled object to implement and the command directly affects motion of the controlled object. As a starting point, a state estimate is received for each of one or more monitored objects and the controlled object, where each state estimate includes state elements, and the state elements are indicative of a position of the respective object and a velocity of the respective object.

Seed states are generated for each of the one or more monitored objects and the controlled object. Movement of the one or more monitored objects and the controlled object is then simulated using the seed states, where the simulation includes the controlled object executing the respective policy. An outcome of the simulation with the seed states is quantified by assigning a cost to outcome of the simulation with the seed states and determining a probability associated with the seed states.

Seed states are perturbed (e.g, using backpropagation) and movement of the one or more monitored objects and the controlled object objects is simulated using the perturbed inputs. Simulating movement of the one or more monitored objects and the controlled objects with different perturbed inputs is repeated until a predetermined condition is met, thereby generating a plurality of perturbed outcomes.

For each policy, a policy score is determined for the respective policy, where the policy score correlates to the perturbed outcome having highest value amongst the plurality of perturbed outcomes for the respective policy. A given policy is then selected from the set of policies, where the given policy has most benign outcome amongst the policies in the set of policies. Lastly, a command is issued to the controlled object in accordance with the given policy.

Simulating movement of the one or more monitored objects, includes representing trajectory of an object using a differentiable function. In one embodiment, the trajectory of an object is presented by recursively applying a transition function over a series of time steps, where the transition function is defined such that objects are repelled by other agents and attracted towards a goal in accordance with a social force model. In addition, perturbed seed states are determined by iteratively computing gradient for each time step in the series of time steps with respect to the perturbed seed states.

In some embodiments, the given policy avoids a set of undesired outcomes, and the set of undesired outcomes includes at least one of (i) a collision between the controlled object and one of the one or more monitored objects; and (ii) the controlled object being within a predetermined distance of the one or more monitored objects.

The cost is determined using a blame metric, where the blame metric is a function of a distance between the controlled object and one of the one or more monitored objects and the velocity of the controlled object. The cost also accounts for the progress toward the goal of the controlled object.

In some embodiments, the set of policies includes at least one of the following commands for the controlled object to: (i) change a trajectory to follow one of the one or more monitored objects; (ii) remain in the same position; (iii) move forward; (iv) decelerate; and (v) accelerate.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings.

In FIG. 6A, the forward propagated outcome of the sampled initial configuration is not discouraging for the robot as it does not inconvenience either agent. For agents i={1,2}, the computed gradients $\nabla_{x_0^i} \ln(C(X))$ (Blue) drive the agents towards configurations where the robot would inconvenience them under its current policy while $\nabla_{x_0^i} \ln(P(x_0))$(Green) drive them to more likely configurations. The agents can be simultaneously updated resulting in a more influential configuration as seen in FIG. 6B.

Corresponding reference numerals indicate corresponding parts throughout the several views of the drawings.

DETAILED DESCRIPTION

Figure 1:
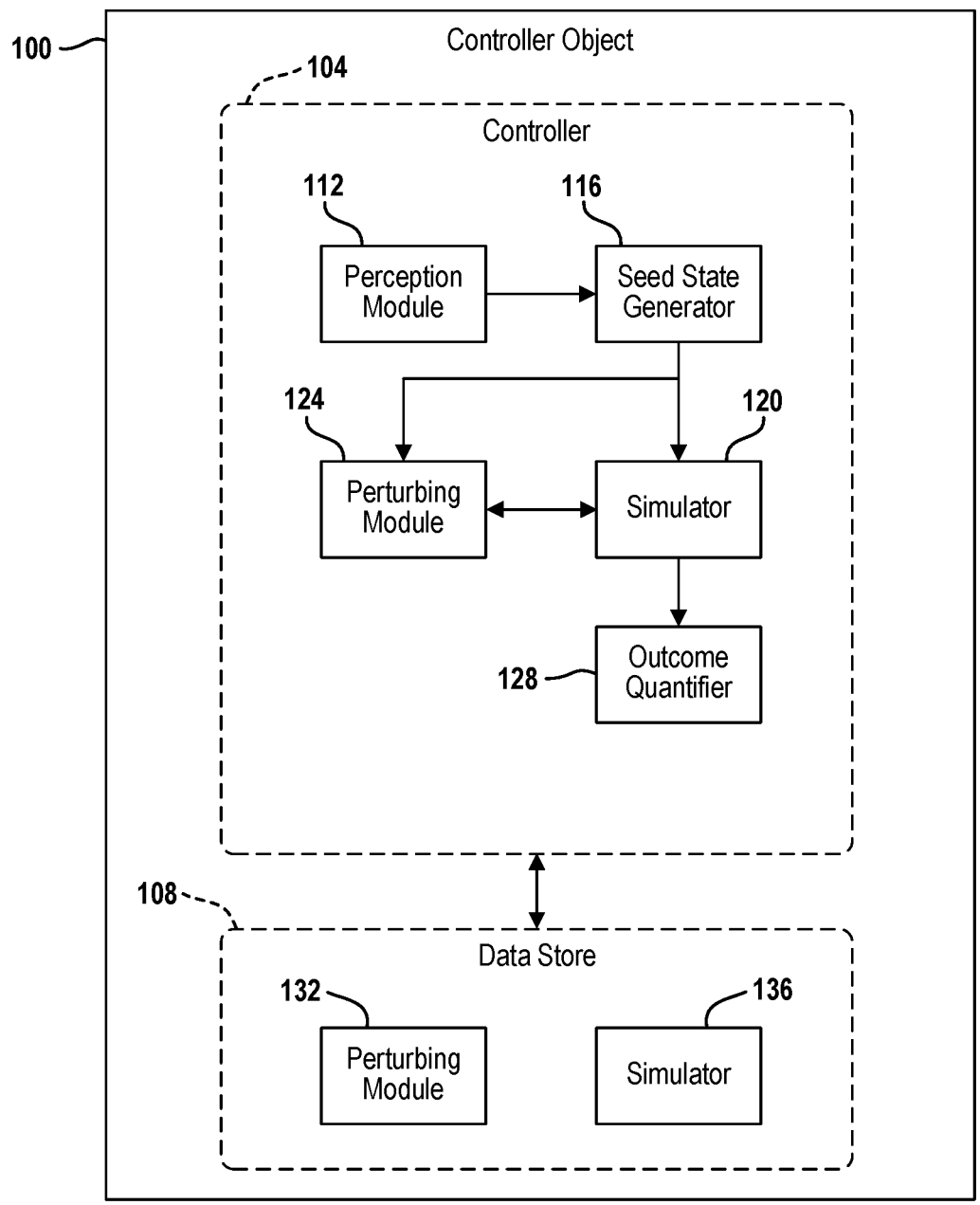
FIG. 1 is a block diagram of an embodiment of a multi-policy decision making (MPDM) apparatus.

In a MPDM framework, a policy of a controlled object is selected by sampling from the distribution of current states, predicting future outcomes through forward simulation, and selecting the policy with the most favorable population of outcomes. Selecting the best policy depends on sampling initial conditions with influential outcomes.

The controlled object has a discrete number of policies to choose from in an environment. The controlled object may be a vehicle, a robot, or any other autonomous object that is configured to move through an environment. Instead of selecting a particular trajectory, the controlled object can choose from a set of policies that provide a rulebook for the controlled object to follow. For example, one of the policies may be to follow a monitored object in the environment. When the controlled object is instructed to follow the particular monitored object, the controlled object's trajectory is not predetermined but is dependent on the particular monitored object.

The model of the environment consists of static obstacles (e.g., walls or doors) and a set of freely moving dynamic agents, assumed to be people.

The robot maintains estimates of the states of observable agents. The $x_i \in X_i$ for agent i (including the robot) consists of its position $p_i$, velocity $v_i$, and a goal point $g_i$.

$$x_i=[p_i,v_i,g_i]^T \quad (1)$$

where each of $p_i$, $v_i$, $g_i$ are two-dimensional vectors. The motion of agents is modeled according to a simple dynamics model in which acceleration, integrated over time, results in a velocity. The force, and hence the acceleration is computed using a potential field method that incorporates the effects of obstacles and a goal point.

Let N be the number of agents including the robot. The joint state space of the system is $X=X_1 \times X_2 \times \ldots \times X_N$. The collective state $x(t) \in X$ includes the robot state plus all the agents visible to the robot at time t.

Our observation model P (z|x) is assumed to be Markovian, where the joint observations z are the pedestrians' positions. For each pedestrian, the goal $g_i$ is not directly observable through z. It is assumed to be one of a small set of salient points and is estimated using a naive Bayes Classifier. For the robot, the goal $g_r$ is provided by a higher level planner.

The agent dynamics are defined by the following differential constraints:

$$\dot{x}_i=[v_i,a_i,0]^T, \quad (2)$$

The action $a_i \in A_i$ corresponds to the acceleration governing the system dynamics and is determined by the policy ξi followed by the agent.

The transition function maps a given state $a_i$ to a new state T: $\mathcal{X}_i \times \mathcal{A}_i \to \mathcal{X}_i$. Thus, the corresponding transition equation is expressed as $$T(x_i, a_i) = x_i(t + \Delta t) = x_i(t) + \int_t^{t+\Delta t} \dot{x}_i(\tau, a_i) d\tau \quad (3)$$

In an example embodiment, a discrete set of high-level closed-loop policies is presented.

$$\xi = \{\text{Go-Solo}, \text{Follow}_j, \text{Stop}\}, \quad (4)$$

where $\text{Follow}_j$ refers to the policy of following agent j. A robot in an environment with 10 observable agents has a total of 12 candidate policies. Each policy maps a joint state of the system to an action via a potential field $\xi i \in \xi: \mathcal{X} \to A_i$.

An agent executing the Go-Solo policy treats all other agents as obstacles and uses a potential field based on the Social Force Model (SFM) to guide it towards its goal. Let $e_{p_i} \to g_i$ be the unit vector towards the goal from the agent i. The attractive force acting on the agent is given by:

$$f_i^{attr}(x) = k_{gs} e_{i \to g_i} \quad (5)$$

The interactions with other agents in the scene are modeled based on the SFM:

$$f_{i,j}^{int}(x) = a_p e^{-d_{i,j}/b_p} \cdot e_{j \to i} \quad (6)$$

where $\{p1, b_p\}$ are the SFM parameters for people, $e_{j \to i}$ is the unit vector from j to i and $d_{i,j}$ is the distance between them scaled by an anisotropic factor.

Similarly, each obstacle $o \in O$ in the neighborhood of the agent exerts a repulsive force $f_{i,o}^{obs}(x)$ on agent i according to different SFM parameters $\{a_o, b_o\}$, $$f_{i,o}^{obs}(x) = a_o e^{-d_{i,o}/b_o} \cdot e_{o \to i} \quad (7)$$

The resultant force is a summation of all the forces described above:

$$f_i(x) = f_i^{attr}(x) + \Sigma_{j \neq i} f_{i,j}^{int} + \Sigma_{o \in O} f_{i,o}^{obs} \quad (8)$$

The action governing the system propagation (2) is calculated as $a_i = f_i$ (without loss of generality, assume unit mass). In one example, it is assumed that all agents besides the robot always use this Go-Solo policy. In other examples, the policy of the agents are estimated by the robot.

In addition to the Go-Solo policy, the robot can use the Follow policy to deal with certain situations. The intuition is that in a crowd, the robot may choose to Follow another person sacrificing speed but delegating the task of finding a path to a human. Following could also be more suitable than overtaking a person in a cluttered scenario as it allows the robot to Progress towards its goal without disturbing other agents (low Force). A reactive Follow policy is proposed, making minor modifications to the Go-Solo policy.

According to the Follow policy, the robot r chooses to follow another agent, the leader, denoted by l. In this case, the robot is attracted to the leader rather than the goal. Let $e_{p_r \to p_l}$ be the unit vector from the robot's position to the leader's position. The attractive force $$f_r^{attr}(x) = k_f e_{p_r \to p_l}, \quad (9)$$

steers the robot trajectory towards the leader. The other agents and obstacles continue to repel the robot as described in (8), The last of the policies available to the robot is the Stop policy, where the robot decelerates until it comes to a complete stop, according to the following force $$f_r(x) = -f_{max} e_{v_r}, \quad (10)$$

where $e_{v_r}$ is the unit vector in the direction of the robot's velocity. It is understood that other types of policies fall within the scope of this disclosure.

To prevent the controlled object from causing disruptions in the environment, it is necessary to discover likely catastrophic outcomes, such as collisions, occurring when each policy is being implemented. Previously, random sampling has been used to predict potential outcomes. Random sampling is conducted based on a position of the controlled object and the monitored objects. However, discovering likely catastrophic outcomes through random sampling is computationally expensive as it is likely to miss high-cost events, even if they are reasonably probable, because of the scarcity of such configurations in the environment. That is, catastrophic or high-cost events may have a high probability density on an individual basis, but when evaluating all occurrences of these high cost events, the total probability mass is low.

Therefore, instead of random sampling, influential outcomes can be identified by perturbing configurations of the controlled and monitored objects iteratively towards those influential outcomes. By locating influential outcomes, the controlled object identifies more high-cost events or worst case scenarios. Then the controlled object may select the policy whose population of discovered likely high-cost outcomes is more benign or desirable. That is, the controlled object is evaluating the quality of each decision available and selecting the decision with the fewest bad outcomes.

Referring to FIG. 1, a block diagram of an embodiment of a MPDM apparatus on a controlled object 100 is illustrated. The controlled object 100 includes a controller 104 and a data store 108. The controller 104 generally includes a perception module 112, a seed state generator 116, a simulator 120, a perturbing module 124, and an outcome quantifier 128, and the data store 108 includes probability distributions 132 and policies 136. In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller 104 is configured to issue a command to the controlled object 100. The command is determined by the policy 136 the controlled object 100 has determined to be the best policy based on the current state of the controlled object 100 and the states of a plurality of monitored objects existing in an environment. For example, the environment may be a hallway, a large room, or any other area with static obstacles. The environment may also consist of freely moving dynamic agents known as monitored objects. The monitored objects include those objects, agents, vehicles, humans, etc. that move freely and independent of the controlled object 100. It is possible to track monitored objects and estimate their state. The perception module 112 estimates a distribution over the state of each monitored object within a certain vicinity of the controlled object 100. It is impossible to accurately predict the future motion of the monitored objects. Given a state for the monitored objects, through the seed state generator 116 or the perturbing module 124, the simulator 120 predicts an outcome. It is envisioned that the objects monitored by the MPDM apparatus can account for stationary and/or moving objects.

The perception module 112 locates the monitored objects in the environment and maintains an estimate of a state for each of the monitored objects. The state for each monitored objects includes a value for the position, speed, and an inferred goal (or policy). The state information for each monitored object may be defined with respect to the controlled object 100. For example, once identified, one monitored object may be a certain distance from the controlled object 100 and travelling at a certain speed with respect to the controlled object 100. The motion of the monitored objects is modeled according to a simple dynamics model in which acceleration, integrated over time, results in a velocity. The force, and hence the acceleration, is computed using a potential field method that incorporates the effects of obstacles and the inferred goal point. Other types of motion models are also contemplated by this disclosure.

The controlled object 100 maintains the estimate of the monitored object's perceived location and speed through the perception module 112. The perception module 112 identifies and evaluates the array of state values for each monitored object for use during forward simulations. The perceived state values provide a configuration of the environment as a function of time. For the controlled object 100 to decide which policy 136 is best to avoid any catastrophic or high-cost events, the controlled object 100 determines, in real-time, out of all the possible trajectory iterations based on the initial configuration, which policy 136 is least likely to result in a high-cost event, such as a collision. Further details regarding determining the initial configuration of the environment is discussed in U.S. patent application Ser. Nos. 14/814,766, 14/814,856, and 14/814,630, all filed Jul. 31, 2015 and each incorporated by reference in their entirety.

For each monitored object, the inferred goal is not directly observable through the positions of the monitored objects. It is assumed to be one of a small set of salient points and is estimated using a naive Bayes Classifier. For the controlled object 100, the goal is provided by a higher level planner.

The seed state generator 116 receives the states for each of the monitored objects from the perception module 112. The seed state generator 116 determines the initial sampling states. For example, based on the initial configuration estimated by the perception module 112, the seed state generator 116 determines the state values at which to begin the forward simulations based on the estimated position of all the perceived monitored objects. The seed state generator 116 samples an initial configuration from the environment based on the state of each object.

In alternative applications, Monte Carlo sampling from the posterior distribution of the states of all objects was used to approximate an expected cost for a simulation. To ensure that high-cost events are recognized and not missed during random sampling, the seed state generator 116 identifies influential outcomes. In other words, influential or high-cost outcomes are explicitly searched for and simulated as high-cost outcomes more strongly influence decision-making of the controlled object 100. For instance, as described in more detail below, state elements (e.g., position, speed, etc.) of the current state of each object may be perturbed while sampling to find high value outcomes (i.e., the product of the probability and the cost). Instead of random sampling from the posterior distribution, an optimization process is instituted to construct bad outcomes. In one embodiment, an anytime algorithm is used to optimize and discover influential configurations. In another embodiment, backpropagation can be used to discover influential outcomes as further described below. Optimizing by discovering influential outcomes lessens the number of sampling required and increases the likelihood of discovering bad outcomes. The influential outcomes indicate how to perturb the state elements of the seed states. Once perturbed, the perturbed inputs are run through the simulator 120. The perturbed inputs, like the seed states, are put into the outcome quantifier 128 to determine perturbed outcomes as the product of the perturbed probability and the perturbed cost. The perturbed cost is determined using the cost function and the perturbed probability is determined from the probability distributions 132.

Further details for an example embodiment of the MPDM system are set forth. In this embodiment, non-holonomic motion models are used for each observed agent i as well as for the robot. The robot maintains a probabilistic estimate of each observed agents' state—i.e. its position, velocity, angular velocity and inferred policy. An agent's policy $\pi_i=(v_{des}, g_{sub})$, expresses an intent to move towards sub-goal $g_{sub}$ at a desired speed $v_{des}$. The collective state $x_t \in X$ consists of the states of the robot and all observed agents at time t. Throughout the disclosure, $x_0$ is referred to as the collective state of all agents and the robot's state at the current time. The probabilistic estimate $P(x_0)$ is based on past observations of the pedestrians' positions. Several methods can be used for $P(x_0)$ based on past trajectories of agents. In the example embodiment, a Kalman Filter is used to infer position and velocity; whereas, a Naïve Bayes Classifier is used to infer an agent's policy. The robot's policy $\pi$ is elected from amongst a set of closed-loop policies $\pi$.

An initial sampled configuration $x_0$ is forward simulated H time-steps (through t=1, ..., H), by recursively applying the transition function T: X→X to yield a trajectory $$X(x_0) = \{x_0, T(x_o), T^2(x_o), \ldots, T^H(x_0)\}$$
$$= \{x_0, x_1, x_2, \ldots x_H\}$$

where $x_t \in X$ is the collective state consisting of the robot state plus all the agents at time t of the forward simulation. The transition function T( ) captures the trajectory that each agent is executing while at the same time considering the interactions with all other agents.

The cost function $C(X(x_0))$ assigns a scalar value to the outcome of a simulation. In the example embodiment, a cost function is used that penalizes the inconvenience the robot causes to other agents in the environment (Blame) along the predicted trajectory and rewards the robot's progress towards its goal (Progress). For blame, one can use the distance to the closest agent as a proxy for the potential disturbance caused to the environment by the robot.

$$B(X(\pi, x_0)) = \sum_{k=0}^{s} \max_{j \neq r} u(\|v_r\| - \epsilon)e^{-d_{r,j}(k)/\sigma}$$

where $d_{r,j}(k)$ is the distance between the robot and agent j and $\|v_r(k)\|$ is the speed of the robot at time-step k. u is the step function with is 1 when the argument is ≥0 and 0—otherwise.

For progress, the robot is encouraged for the distance-made-good during the planning horizon.

$$PG(X(\pi,x_0))=(p_r(s)-p_r(0))\cdot e_{p_r \to g_r}$$

where $p_r(k)$ is the position of the robot at time-step k and $e_{p_r \to g_r}$ is the unit vector from the current position of the robot to the goal $g_r$. The resultant cost function is a linear combination of both $$C(X(\pi,x_0))=-\alpha PG(X(\pi,x_0))+B(X(\pi,x_0))$$

where α is a weighting factor. Other cost functions are also contemplated by this disclosure.

In risk-aware MPDM, the robot's policies are evaluated based on the most influential (likely and high-cost) outcome that may occur. Such outcomes are discovered by optimizing a probabilistic cost surface max $\{P(x_0)C(X(\pi, x_0))\}$, instead of the expected value of the cost function approximated by sampling.

Algorithm 1 below describes the policy election for risk-aware MPDM. Provided with a probability distribution over initial configurations, $P(x_0)$, a set of candidate policies, π, and a forward simulation budget, Nπ, each candidate policy is evaluated (scored) according to the most influential (worst case) outcome discovered within the computational budget.

The objective function $P(x_0)C(X)$ can have multiple local-minima depending on the number of agents and the complexity of the initial configuration. Finding the global maximum through exhaustive search is computationally infeasible due to the large state-space. The goal is to quickly find an influential configuration whose value is comparable to the global optimum even if it may not be the highest-valued configuration.

The following Algorithm 1 describes the policy election for risk-aware MPDM, that is, Algorithm 1 identifies influential or worse case outcomes.

---

Algorithm 1 Policy Election for Risk-aware MPDM

---

1: function Policy-Election Loop (P (x), Π, $N_\pi$)
2:    for π = Π do
3:        Initialize $U_\pi$, n ← 0
4:        while n < $N_\pi$ do
5:            Sample $x_0$~P(x)
6:            U*, $n_{opt}$ ← Optimize ($x_0$, π)
7:            n ← n + $n_{opt}$
8:            $U_\pi$ ← max{U*, $U_\pi$}
9:        end while
10:   end for
11:   π* ← arg $\min_\pi U_\pi$
12: end function

---

The algorithm samples an initial configuration from $P(x_0)$ as indicate at line 5 and optimizes it, perturbing the sampled configuration iteratively towards increasingly influential outcomes until convergence to a local optima whose objective function value is U* as indicated at line 6. The number of forward simulations $n_{opt}$ used by an optimization procedure corresponds to its rate of convergence. Upon convergence, a new initial configuration is sampled and this process is repeated until the forward simulation budget $N_\pi$, is consumed. The utility of a policy $U_\pi$ is the most influential (highest-valued) configuration encountered. The policy with the least risk is elected.

With continued reference to FIG. 1, provided with a probability distribution over initial configurations $P(x_0)$, where $x_0$ represents the state elements of all the objects at a current time, a set of candidate policies Π 136, and a forward simulations budget $N_\pi$, each candidate policy 136 is evaluated and scored according to the most influential or worst case outcome discovered within the computational budget. The outcome (e.g., the product of the probability and cost) has multiple local minima depending on the number of objects and the complexity of the initial configuration. Finding the global maximum through exhaustive search is computationally infeasible due to the large state-space. Since the collisions are heavily penalized, a configuration whose value is comparable to the global optimum is likely to be a collision and should therefore influence decision-making.

The simulator 120 is provided the seed states from the seed state generator 116 as further described below. Based on the seed states, the simulator 120 conducts forward simulations of a joint state until a time horizon. The joint state is the state values for all of the monitored objects and the controlled object 100. The simulator 120 simulates the forward movement of each object in the environment for each of the potential policies 136 guiding the controlled object 100. The forward simulation allows for the controlled object 100 to execute each of the possible policies 136 and iterate through all of the possible scenarios for each of the monitored objects that are perceivable by the controlled object 100. That is, the simulator 120 forward simulates each of the possible variations of movements for each of the monitored objects while the controlled object 100 is executing different policies 136. With each simulation, a cost and a probability may be determined for each of the policies 136. The probability may be determined from the probability distributions 132 included in the data store 108. The probability is based on the generated seed states.

The cost for each seed state and each policy 136 is calculated using a cost function. The cost function consists of two different components: (i) blame which captures the potential disturbance that the robot causes in the environment and (ii) progress which indicates progress made towards the goal of the controlled object 100. The distance between the controlled object 100 and the closest monitored object is used as a proxy for the potential disturbance caused to the environment by the controlled object 100. The controlled object 100 is also encouraged for the distance-made-good during a planning horizon. For a sampled initial configuration, the predicted trajectory is evaluated using a cost function. High value outcomes correspond to those where the controlled object 100 inconveniences monitored objects by driving too close to them, thus accumulating high blame. The controlled object 100 is also rewarded according to the progress it makes towards the goal.

The planning horizon is the amount of time into the future the simulator 120 predicts or simulates movement, e.g., three seconds. The cost function is calculated as a linear combination of both the blame and the progress. Additionally, to approximate the expected cost, a sampling technique is used. The sampling technique seeds the forward propagation of the joint state, which results in a set of different future trajectories. Therefore, the controlled object's 100 behavior reflects not only the mean state estimates of monitored objects, but also the uncertainty associated with the mean state estimates.

The outcome quantifier 128 calculates an outcome as a product of the probability and the cost for the generated seed state. The outcome indicates a score based on the policy 136 and the seed states. The score determines how good or bad choosing the respective policy 136 is under the seed state conditions. This forward simulation is conducted iteratively for each policy 136 and for many seed states to determine which policy 136 is most ideal under the presented conditions or configurations.

The perturbing module 124 also receives the seed states from the seed state generator 116 and perturbs these states. The perturbing module 124 optimizes the seed states by perturbing the seed states iteratively towards increasingly influential outcomes. An optimization procedure should converge in as few forward simulations (or iterations) as possible to its closest local optima.

Backpropagation may be used to perturb the seed states iteratively towards increasingly influential outcomes. Deep neural networks model complex functions by composing (chaining) relatively simple functions. Similarly, a forward simulation captures the complex dynamics of the system using simple one-step transition functions. Since the cost function is a linear combination of costs computed along the trajectory, the forward simulation can be conceptualized as a deep network that outputs a trajectory cost $C(X(x_0))$ based on the input initial configuration. A function can accumulate the cost of a trajectory from the final time backwards to the initial time. This backpropagation can identify the most influential outcomes by starting at the final time and finding the trajectory to work backwards to the initial configuration.

Let $L_t(x_t)$ be the cost accrued at time-step t for the state $x_t$. Define a function $\Phi(t, X)$ that accumulates the cost of a trajectory, from the final time H backwards to the initial time t=0 as $$\Phi(t,X) = \Sigma_{T=t}^{H} L_T(x_T). \quad (11)$$

The objective cost can be expressed as $(X) = \Phi(0,X)$. One can formulate $\Phi$ recursively as:

$$\Phi(t,X) = \Phi(t+1,X) + L_t(x_t). \quad (12)$$

One would want to compute $\nabla x_0 C(X) = \nabla x_0 \Phi(0, X)$. The gradient of the cost at time-step H is $$\nabla_{X_H} \Phi(H, X) = \frac{\partial \Phi(H, X)}{\partial x_H} = \frac{\partial L_H, X_H)}{\partial x_H} \quad (13)$$

One can compute the gradient iteratively from time-step H backwards to t=0 by applying (12) and expanding terms:

$$\nabla_{x_t} \Phi(t, X) = \frac{\partial \Phi(t, X)}{\partial x_t} = \frac{\partial \{\Phi(t+1, X) + L_t(x_t)\}}{\partial x_t} \quad (14)$$

$$= \frac{\partial \Phi(t+1, X)}{\partial x_t} + \frac{\partial L_t(x_t)}{\partial x_t}$$

$$= \frac{\partial \Phi(t+1, X)}{\partial x_{t+1}} \frac{\partial x_{t+1}}{\partial x_t} + \frac{\partial L_t(x_t)}{\partial x_t}$$

$$= \frac{\partial \Phi(t+1, X)}{\partial x_{t+1}} \boxed{\frac{\partial T(x_t)}{\partial x_t}} + \frac{\partial L_t(x_t)}{\partial x_t}$$

Eqn. 14 can be used to efficiently compute $\nabla x_0 C(X)$ as long as the gradient of transition function can be computed effectively.

This disclosure recognizes that the kinematic models used for the agents have an impact on the quality of the gradients. An alternative approach can use a simple double integrator model for all agents with heuristics to restrict lateral motion for more realistic simulation. While the simple model was useful for fast forward simulation, the heuristics contain hard thresholds that manifest as zeros in the matrix $$\frac{\partial T(x_t)}{\partial x_t}.$$

As a result, useful gradients are truncated (as highlighted by the box in Eqn. 14 hampering effective backpropagation. Thus, the use non-holonomic kinematic models that augment the agent's state with angular velocity to capture the effect of lateral forces is preferred. This model ensures the differentiability of T while maintaining realistic human motion in the forward simulation.

Specifically, the headed social force model (HSFM) is used for all the pedestrians and a unicycle-like model for the robot as described below. For the robot, the net force is computed using the SFM $f_{net}^r$, but due to the inherent constraints on a wheeled platform, transform $f_{net}^r$ into a compliant reference signal $(V_{ref}, W_{ref})$ for a lower-level velocity controller $$\begin{matrix} v_{ref} \\ w_{ref_{t+1}} \end{matrix} = \begin{bmatrix} \cos(\theta) & \sin(\theta) \\ -\sin(\theta) & \cos(\theta) \end{bmatrix} \begin{bmatrix} 1 & 0 \\ 0 & 1 \end{bmatrix} f_{net}^r \quad (15)$$

The lookahead distance l determines the tendency of the robot to turn to compensate the lateral force. The robot's state is then propagated towards the reference signal using a first-order model for each of the independent wheel velocity controllers and a unicycle plant model.

Figure 5:
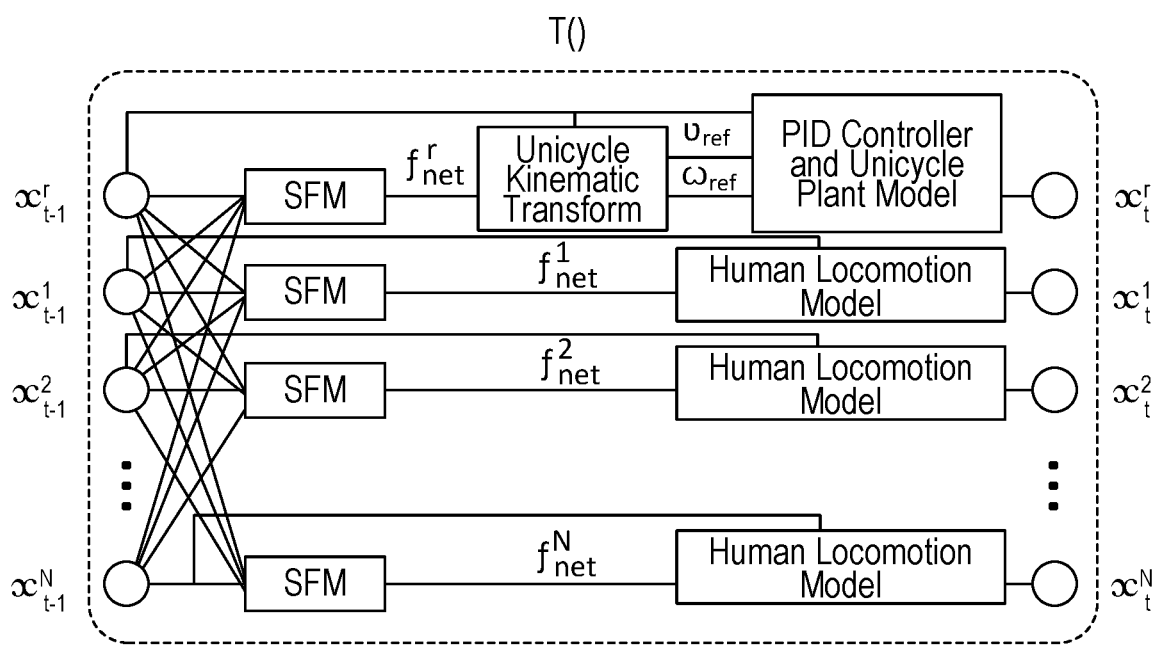
FIG. 5 is a block diagram of an example transition function. Block diagram of the transition function. At each time-step, an agent i (in this case, the robot) is repelled by other agents ($f_{rep}^j$) and attracted towards its sub-goal $g_{sub}$ in accordance to the Social Force Model (SFM). Pedestrians are modeled using the HSFM model where the social force acts as a control input for the Human Locomotion Model. The robot is modeled like a unicycle and the social force $f_{net}^r$ is transformed into a compliant reference signal ($v_{ref}$, $w_{ref}$) for a lower-level velocity controller.

Referring to FIG. 5, the proposed transition function layer $T(x_t)$ allows one to compute accurate gradients of the transition function. Eqn. 14 can now be implemented efficiently via backpropagation, where $$\frac{\partial T(x_t)}{\partial x_t} \text{ and } \frac{\partial L_t(x_t)}{\partial x_t}$$

are computed during the forward propagation and cached.

Figure 6A:
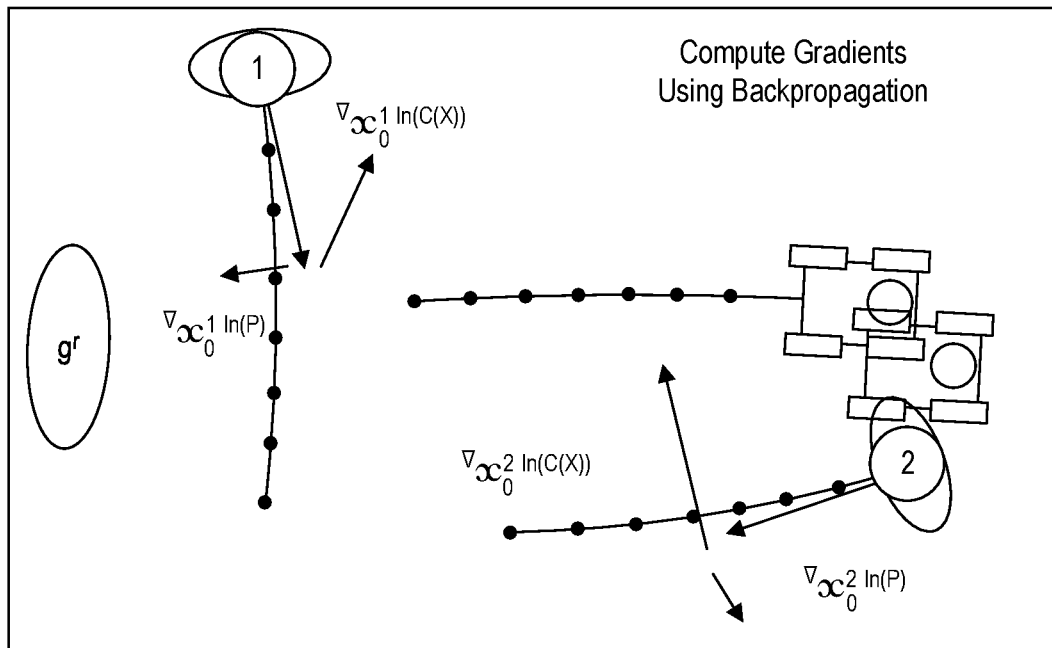
FIGS. 6A and 6B are diagrams illustrating backpropagation.
Figure 6B:
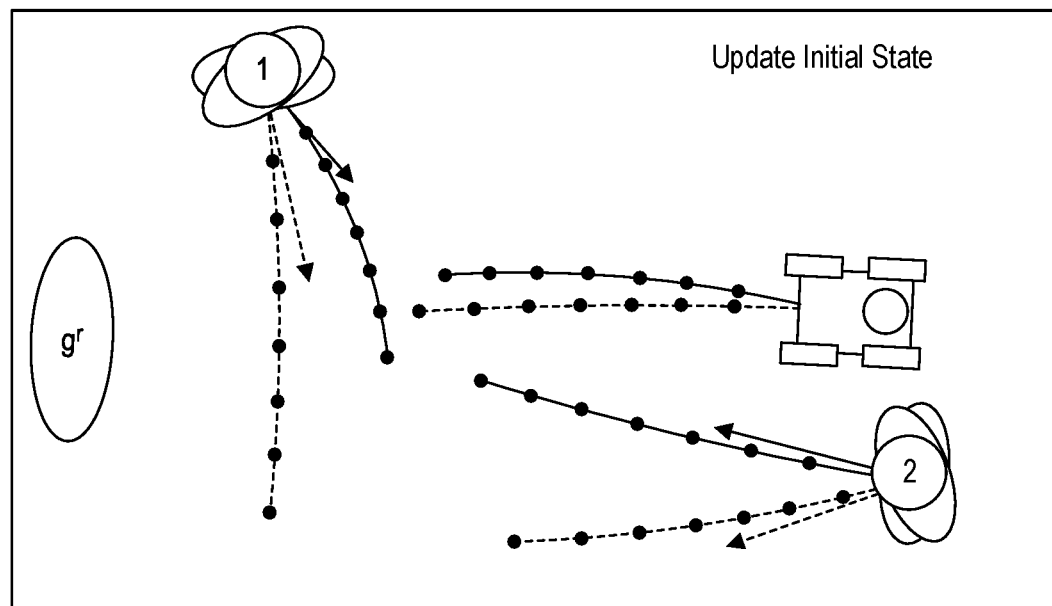

FIGS. 6A and 6B illustrate one iteration of gradient descent using backpropagation through a simple initial configuration $x_0$ consisting of two agents and the robot executing the Go-Solo policy towards its goal $g_r$. The heuristic-based stochastic gradient method (SGA) computed approximate gradients for each agent and perturbed one agent at a time to avoid divergence. In contrast, by computing accurate gradients, one can perturb all the agents simultaneously without divergence. The gradient also accounts for agent-agent interactions as well as static obstacles.

Backpropagation, or any other method known in the art to identify influential outcomes, can be used to perturb the seed states and simulate using the perturbed seed states. The forward simulation of the perturbed seed state results in a perturbed outcome. The plurality of outcomes (product of probability and cost) for each of the possible policies 136 are used to identify which policy 136 has the best worst case scenario. That is, the best worst case scenario is, out of all the forward simulations for each of the policies 136, the policy that has the best or most benign high-cost scenarios, including near misses. Once the best policy is identified, the controller 104 issues a command based on the selected policy.

There may be any number of policies 136 included in the data store 108. In the example embodiment, the policies 136 are go solo, follow one of the monitored objects, and stop. The controlled object 100 executing the go solo policy treats all monitored objects as obstacles and uses a potential field based on a Social Force Model (SFM) to guide it towards the goal of the controlled object 100. The SFM is described in "Social-aware robot navigation in urban environments," in European Conference on Mobile Robotics, by G. Ferrer, A. Garrell, and A. Sanfeliu, 2013, pp. 331-336, which is incorporated by reference. In this embodiment, it is assumed that all monitored objects follow the go solo policy although policies of the monitored object may be inferred in other embodiments.

The controlled object 100 can also use the follow policy to deal with certain situations. In a crowd, the controlled object 100 may choose to follow one of the monitored objects sacrificing speed but delegating the task of finding a path to another object. Following could also be more suitable than overtaking the monitored object in a cluttered scenario as it allows the controlled object 100 to progress towards its goal without disturbing other agents, resulting in low blame.

According to the follow policy, the controlled object 100 chooses to follow one of the monitored objects, deemed a leader. The follow policy dictates that the controlled object 100 is attracted to the leader rather than the goal. The stop policy simply instructs the controlled object 100 to remain still. As the controlled object 100 is determining in real time which policy 136 results in the most benign high-cost scenarios, the policy 136 of the controlled object 100 is constantly changing and being reevaluated. Due to the low computational requirements of evaluating the set of policies 136, the controlled object 100 can re-plan frequently. Frequent re-planning helps reduce the impact of uncertainty.

Figure 2:
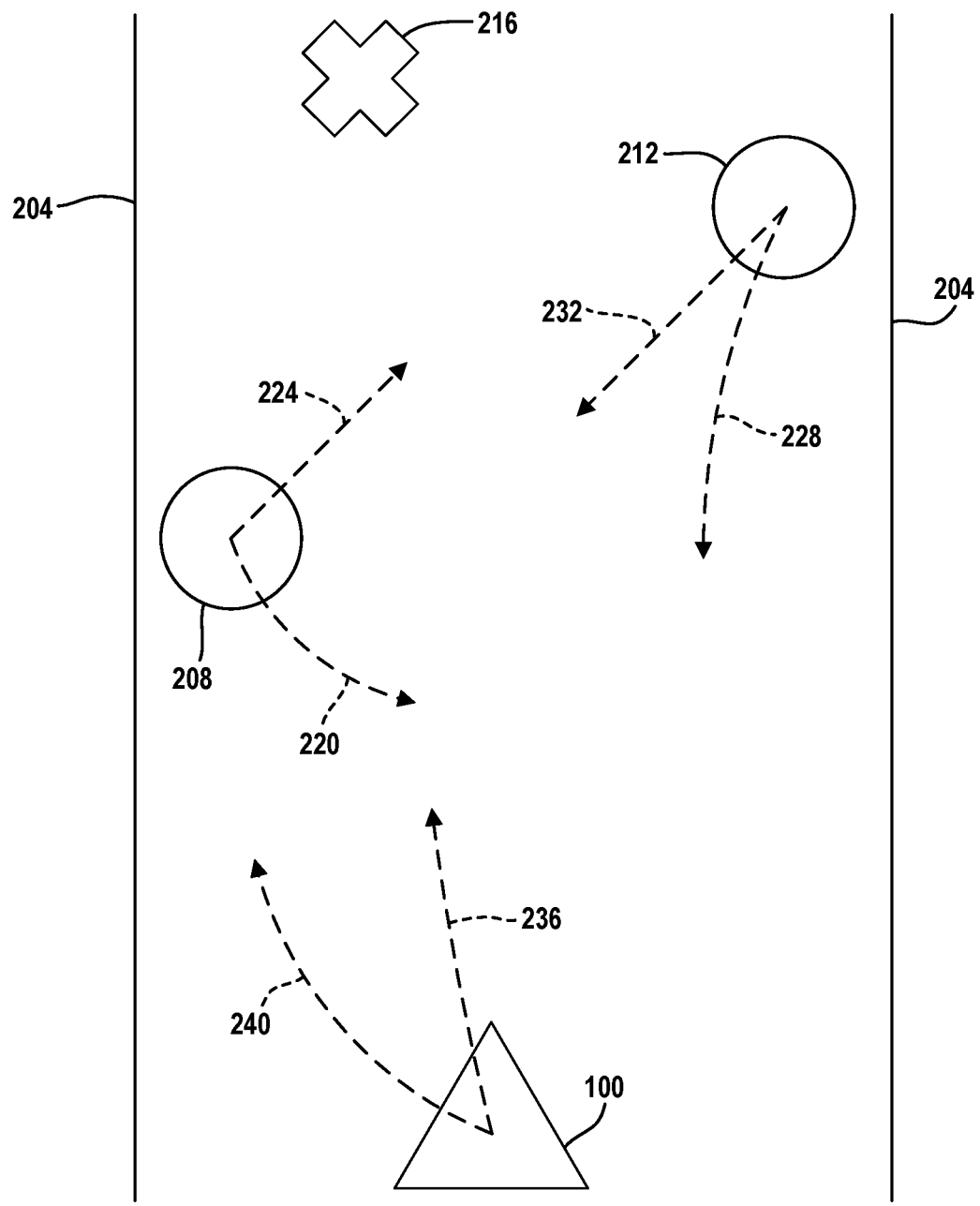
FIG. 2 is a diagram of an environment where a controlled object would institute MPDM.

Referring now to FIG. 2, a diagram of an environment where a controlled object 100 would institute MPDM is illustrated. The environment includes the controlled object 100, walls 204 or any kind of static object, a first monitored object 208, a second monitored object 212, and a target 216 or goal for the controlled object 100 to reach. As described with respect to FIG. 1, the controlled object 100 includes the controller 104 coupled to the data store 108. In the environment, the controlled object 100 identifies the walls 204, the first monitored object 208, and the second monitored object 212 with the perception module 112.

The perception module 112 determines values indicating position, velocity, and inferred goals for both of the monitored objects 208, 212. The determined values are states for the monitored objects 208, 212. Since the monitored objects 208, 212 move freely through the environment, each monitored object's 208, 212 goal cannot be perceived, only predicted. Additionally, each monitored object 208, 212 has an unlimited number of trajectory options, some options are shown in FIG. 2. The first monitored object 208 has multiple options of trajectories 220, 224 that the controlled object 100 must evaluate, and the second monitored object 212 has multiple trajectories 228, 232 that the controlled object 100 must evaluate as well.

Based on the position, velocity, and inferred goal, the seed state generator 116 samples initial configurations or seed states of the monitored objects 208, 212 to use during simulations of each policy 136. The simulator 120 determines a result or outcome of a scenario using the sampled initial configurations for each of the potential policies 136. The perturbing module 124 then perturbs the initial configurations to create a worse outcome or a higher-cost event. The perturbing may be conducted using a number of known methods in the art, one of which is backpropagation, as discussed above. After perturbing the initial configurations, the simulator 120 conducts the simulation on the perturbed states, and then, with the outcome quantifier 128, determines the outcome of the perturbed scenario. The initial configurations are perturbed and simulated for a predetermined period.

The predetermined period may be an amount of time that the controlled object 100 has to select a policy or a certain number of iterations before selecting a policy. After conducting simulations for the predetermined period, the controlled object 100 selects the policy whose population of discovered likely high-cost outcomes is more benign or desirable. That is, the selected policy includes the most benign worst case, high-cost events. Selecting one of the policies results in the controlled object 100 following one of multiple trajectories 236, 240. To advance toward the target 216, the controlled object 100 may determine that going solo may be the policy with the most benign high-cost events, which may result in a direct trajectory toward the target 236. Alternatively, the controlled object 100 may determine that following either the first monitored object 208 or the second monitored object 212 would result in the most benign high-cost events. Following the first monitored object 208 may result in a trajectory such as 240, with the controlled object 100 accelerating to catch up behind the first monitored object 208 and remaining behind the first monitored object at a similar speed. As another option, the controlled object 100 may stop and stay in place until a different policy results in the most benign high-cost events.

Once the policy is selected, a command is issued to the controlled object 100, such as change a trajectory to follow one of the one or more monitored objects, remain in the same position, move forward, decelerate; accelerate, or any other directive in accordance with the policy. Since the controlled object 100 is selecting policies in real time, the controlled object 100 is always computing which of the policies result in the most benign high-cost events and updating which policy to adhere to in accordance with the computations.

Figure 3:
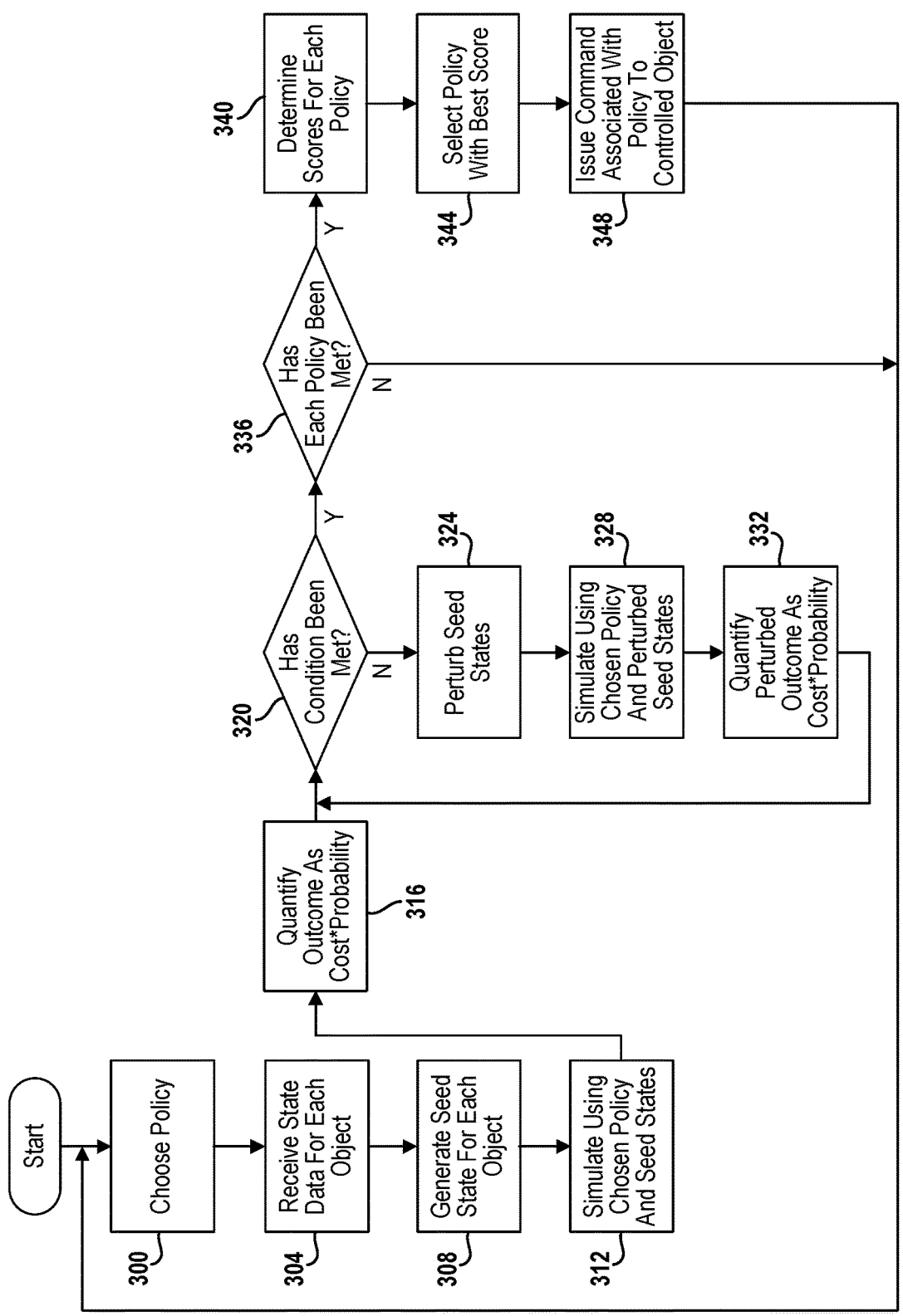
FIG. 3 is a flowchart of an embodiment of the MPDM apparatus.
Figure 4:
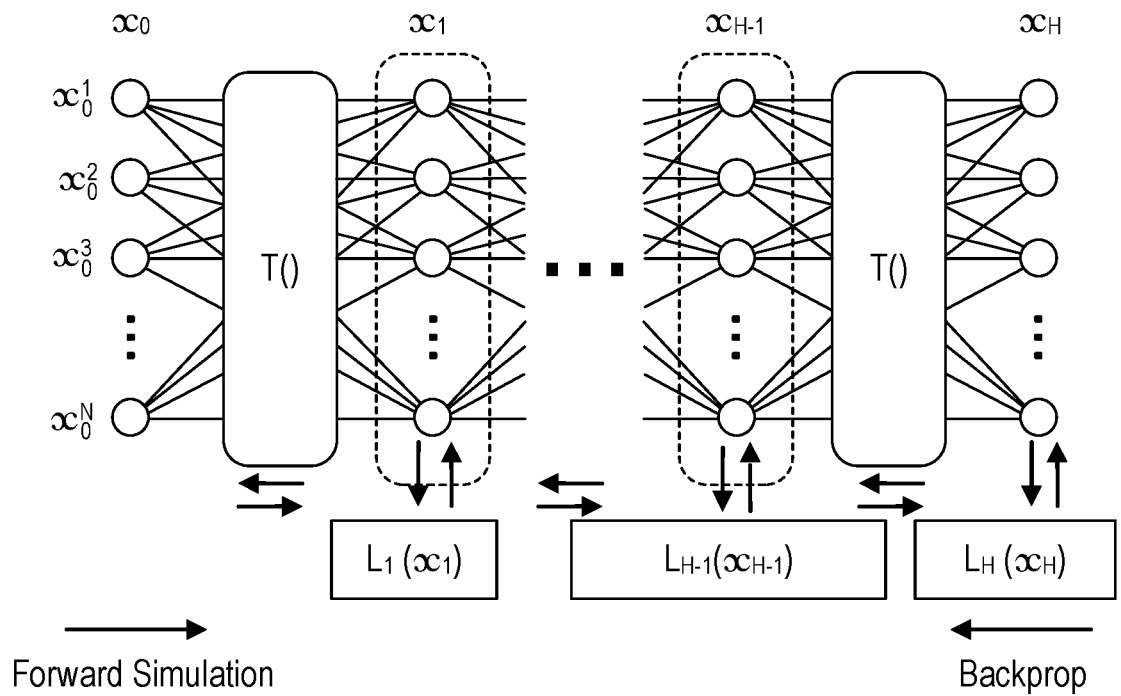
FIG. 4 is a diagram of a deep network representation for a cost function. The initial configuration x0 propagates through several layers, each representing the transition function T. The output of layer t determines a cost. The cost function accumulates costs calculated at each time-step along the forward simulated trajectory.

Referring now to FIG. 3, a flowchart of an embodiment of the MPDM apparatus is illustrated. The controlled object 100 is always perceiving the states (e.g., locations, speed, etc.) of all the monitored objects in the environment and determining a trajectory based on the possible outcomes due to the initial configurations. To determine the trajectory, the controlled object 100 evaluates each of the policies 136. First control chooses a policy to evaluate 300 from all of the potential policies 136. Next, at step 304, control receives state data for each of the monitored objects 208, 212. The state data is obtained by the perception module 112. Seed states for each of the monitored objects 208, 212 are generated at 308 using the seed state generator 116. The seed states correspond to initial configurations that the simulations use as input. The simulator 120 then simulates using the chosen policy and the seed states at 312. At step 316, the outcome is quantified as the cost multiplied by the probability using the outcome quantifier 128. As discussed above, the cost function is calculated as a combination of blame for disturbing objects in the environment as well as progress towards the target 216. The probability is determined from the probability distributions 132.

At step 320, control determines whether a condition has been met. The condition may be a variety of predetermined conditions, such as an amount of time, a number of perturbations or iterations, a policy-specific condition depending on which policy is currently being implemented by the controlled object 100, or any other condition that has been predetermined. In other words, step 320 controls the number of times the seed states are perturbed and simulated to determine which policy results in the most benign high-cost events.

If the condition has not been met, control continues to step 324 where the seed states are perturbed. That is, the elements of the seed states (i.e., position, speed, etc.) are perturbed iteratively towards increasingly influential outcomes using a method such as backpropagation. This perturbation directs the perturbed seed state configurations towards outcomes that result in high-cost events. Then, at 328, the simulator 120 simulates using the chosen policy and the perturbed seed states. The outcome quantifier 128 then quantifies a perturbed outcome as the product of the perturbed cost and the perturbed probability at 332. The perturbed cost and perturbed probability are determined based on the perturbed seed states. The seed states are perturbed iteratively towards increasingly influential outcomes until the condition has been met. At that point, control determines whether each policy 136 has been simulated 336. If not, control returns to the beginning to select a different policy at 200.

Once control determines that each policy has been simulated at 336, then scores are determined for each policy at 340. The policy with the best score is selected at 344. The best score can be described as the score indicating the fewest number of the most benign high-cost events. This ensures the best possible scenario for the controlled object 100. That is, the controlled object 100 selects the policy whose population of discovered likely high-cost outcomes is more benign or desirable. For example, a more desirable policy includes a lower chance that the selected policy will result in a collision or a near miss, etc. Once the policy is selected, control issues a command associated with the policy to the controlled object 100 at 348. As mentioned previously, the commands may be a command to accelerate, decelerate, etc. Control conducts the MPDM shown in the flowchart in real-time to determine, at all points in time, which policy 136 is best for the controlled object 100 to follow.

As a proof of concept, simulations were conducted. The simulated environment consists of an open space, freely traversed by 15 agents that can randomly change speed or direction while the robot tries to reach its goal. MPDM relies on quick decision making and replanning (every 300 nms) to react to sudden and unexpected changes in the environment.

A pedestrian can suddenly come to a stop, slow down or speed up. One can model this as a distribution over the preferred speed of each agent that is a mixture of two truncated Gaussians—one centered around the estimated most-likely current speed with a σ=0.4 m/s to account for speeding up or slowing down and a truncated half Gaussian with a peak at 0 and σ=0.2 m/s to account for coming to a sudden stop.

A pedestrian can also suddenly change direction without signaling. In order to account for uncertain direction for each agent, the robot assumes a Gaussian centered around the agent's estimated most-likely orientation and σ=30° that determines the agent's waypoint. All truncated Gaussians are restricted to μ±1.5 σ. A pedestrian's sub-goal is inferred from a set of salient points using a Naive Bayes classifier.

For a sampled initial configuration, the predicted trajectory is evaluated using a cost function. High-cost outcomes correspond to those where the robot inconveniences other agents by driving too close to them, thus accumulating high Blame. The robot is also rewarded according to the Progress it makes towards the goal. Further description for these metrics can be found in "Fast discovery of influential outcomes for risk-aware MPDM" in Proceedings of the IEEE International Conference on Robotics and Automation, 2017 which is incorporated in its entirety by reference.

A dataset is generated consisting of 16,000 randomly chosen simulated scenarios where at least one agent was present within 5 m of the robot. Then sort them based on the number of agents in the robot's neighbourhood. The objective function $P(x_0)C(X)$ is defined over innumerable possible initial configurations belonging to a high-dimensional continuous space that scales linearly with the number of agents considered. For each scenario, 2,000 random samples were optimized and the worst-case outcome was used to approximate the global optimum.

Next, vary the number of agents in the robot's vicinity, thus increasing the complexity of the scenario and the dimensionality of the state space. For reliable real-time policy evaluation, influential outcomes must be detected quickly. Estimate the number of iterations needed by each algorithm to achieve a certain fraction (50%) of the worst outcome in the dataset (find an influential outcome). For each algorithm, the experiment is run 1,000 times on each scenario. Use bootstrap sampling (with replacement) on the data set to estimate the mean and standard error of their performance.

Figure 7:
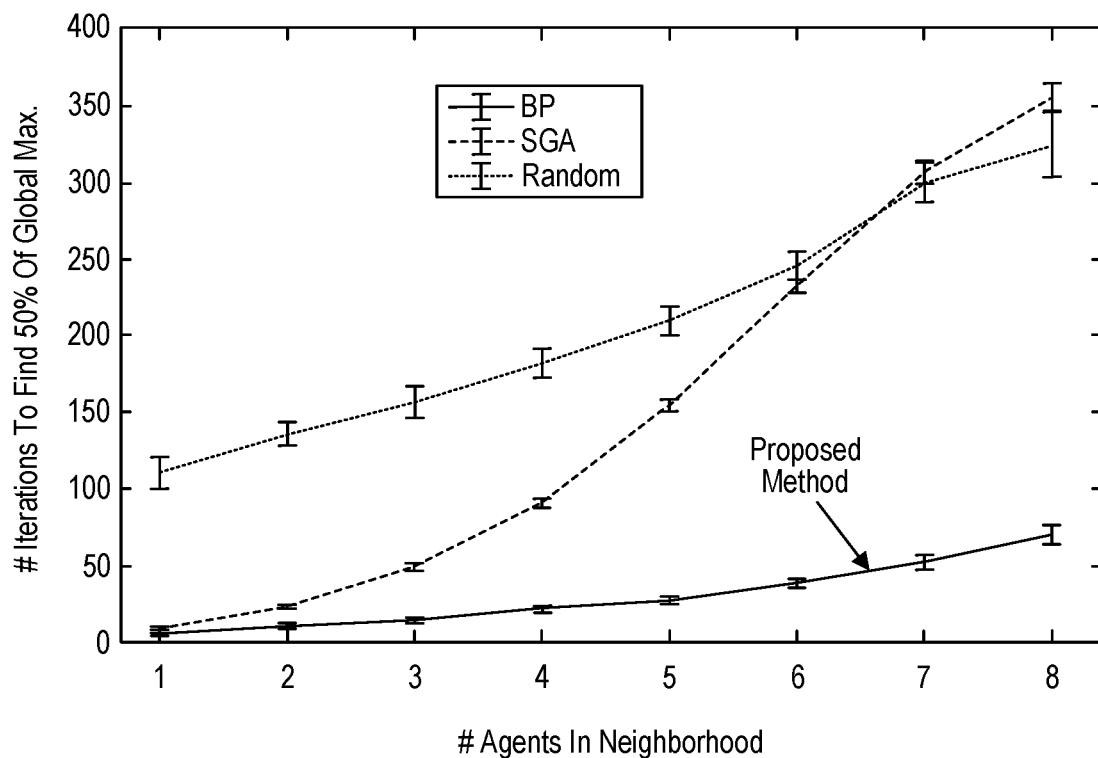
FIG. 7 is a graph depicting degradation of stochastic gradient ascent in crowded scenarios. For each algorithm, estimate the mean and standard error of the number of iterations (forward simulations) taken to discover an influential outcome varying the number of agents in the robot's vicinity, and thereby the dimensionality of the search space. The lower the slope, the better, more robust the algorithm to complex scenarios with high-dimensional search spaces. Random sampling, as expected, requires many samples even in simpler configurations. SGA cannot find influential outcomes efficiently in complex scenarios with multiple agents, scaling so poorly that for more than six agents it performs worse than random sampling. BP is able to find those adverse outcomes even for crowded scenarios with 8 people.

Stochastic Gradient Ascent computes approximate agent-specific gradients of a simplified cost function. In order to limit the divergence arising due to these approximations, the stochastic gradients are ranked using a heuristic function and only the most promising agent is perturbed at a time. Despite performing well in scenarios involving few agents, this method does not scale well to more challenging crowded settings. FIG. 7 shows that although all the algorithms take longer to find influential outcomes as the complexity of the environment grows, the performance of SGA deteriorates sharply for more than 3 agents. Beyond 6 agents, it performs as poorly as random sampling since it takes a long time to converge from a sampled initial configuration to a local optimum. Backpropagation, on the other hand, overcomes these limitations as it computes accurate gradients, and all agents can simultaneously be updated without divergence.

Through six hours of navigation in the simulated environment, it was demonstrated that the proposed approach, unlike SGA, can reliably evaluate a large policy set. Each simulation 'epoch' consists of a random initialization of agent states followed by a 5 minute simulated run at a granularity $\Delta t=0.15$ s. In the simulator, the observations z are modeled using a stationary Gaussian distribution with uncorrelated variables for position, speed and orientation for the agent. Parameterize this uncertainty by a scale factor $\{\sigma_{p_x}, \sigma_{p_y}, \sigma_{|v|}, \sigma_\theta\}=\{10$ cm, 10 cm, 10 cm/s, 15°$\}$. The corresponding diagonal covariance matrix is denoted by diag $(\sigma_{p_x}, \sigma_{p_y}, \sigma_{|v|}, \sigma_\theta)$ Do not perturb the goal and assume no angular velocity (ignoring any uncertainty). These uncertainties are propagated in the posterior state estimation P(x|z).

The simulation experiments are run on an Intel i7 processor and 8 GB RAM to mimic the computational capabilities of the robot. In order to react to sudden changes, MPDM relies on quick re-planning. The robot must replan every 300 ms for effective real-time navigation. The performance of risk-aware MPDM is evaluated using 2 candidate sets of policies—a large candidate set with 10 policies, and a small set with 2 policies:

1) 2 Policies—{Go-Solo, Stop}—The robot evaluates going straight towards the goal at maximum speed (1.5 m/s) and stops if it senses danger.
2) 10 Policies—{(Fast, Medium, Slow)×(Straight, Left, Right), Stop}—Rather than going straight towards the goal at maximum speed, the MPDM may also choose to go at Medium speed (0.9 m/s) or Slowly (0.2 m/s). Simultaneously, the robot can also choose to create a sub-goal to the Left or Right of the goal instead of going Straight to the goal as in Go-Solo.

Record the Time Stopped per goal reached, as well as the Blame normalized by the distance to goal (Blame per meter traveled). Time Stopped indicates the failure of the planner to find a safe policy. With a larger policy set, the robot is more likely to find a safe policy, and Stops less often. However, if the robot cannot evaluate its policy set quickly enough, it is unable to react to sudden changes in the environment and accumulates Blame. Ideally, one would like a robot navigate safely (low Blame), with minimal Stop-and-Go motion.

Figure 8:
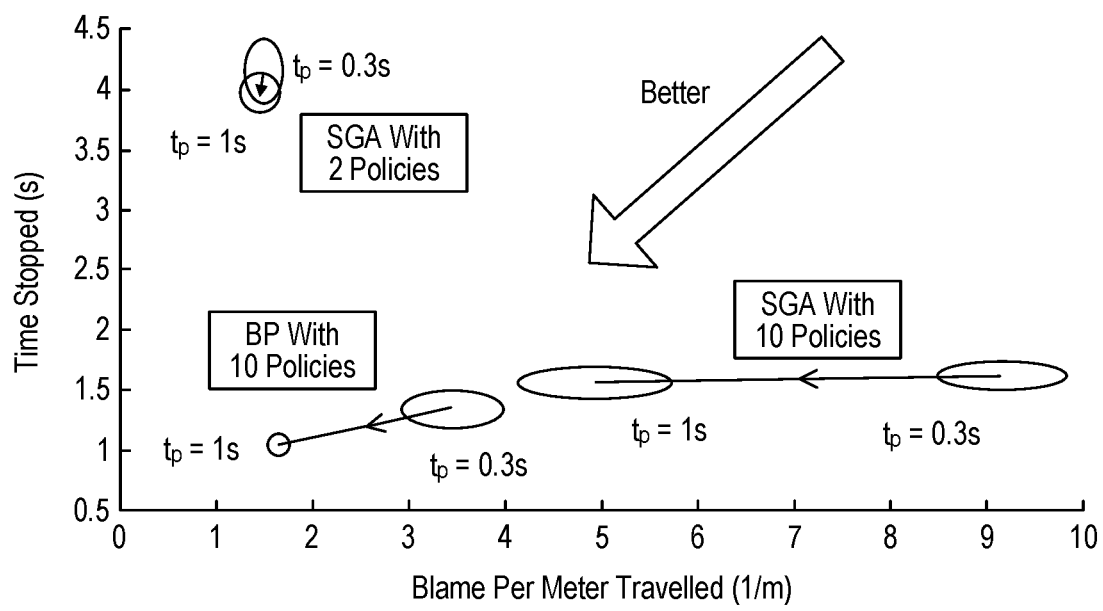
FIG. 8 is a graph comparing experimental results of the proposed method to the stochastic gradient ascent approach. BP can evaluate 10 policies reliably in real-time, while SGA cannot. Compare the performance of various algorithms on 6 hours of navigation in the simulated environment. Measure the Time Stopped for every goal reached as well as the Blame per meter traveled by the robot. For each algorithm, use bootstrap sampling to estimate the mean and standard error for these metrics, represented by the axes of an ellipse. Lower the Blame or Time Stopped, the better. Run the simulator in real-time allowing a planning time $t_p$=0.3 s. Although SGA can evaluate the smaller policy set reliably in real-time, the lack of options results in frequent Stopping. Unfortunately, SGA cannot evaluate a larger policy set of 10 policies reliably and accumulates large Blame. Since BP can evaluate the larger policy set more quickly and reliably than SGA, the robot navigates safely (low Blame) in real-time without Stopping unnecessarily. Upon slowing down the simulator (three times slower than real-time) to allow an unrealistic planning time of $t_p$=1 s, one observes that SGA with 10 policies is able to drastically reduce Blame. However, even then BP outperforms SGA.

FIG. 8 shows how the inefficiencies in SGA become a performance bottleneck. While SGA can navigate safely (low Blame) with the small policy set, it often fails to find safe policies and stops. With 10 policies, SGA fails to find influential outcomes fast enough resulting in high Blame. The proposed method, BP can reliably evaluate the large policy set in real-time, which significantly improves navigation performance.

In the example embodiment, the system is implemented on the MAGIC robot, a differential drive platform equipped with a Velodyne VLP-16 laser scanner used for tracking and localization. LCM is used for inter-process communication. Every 300 ms, MPDM evaluates a set of policies and chooses the least risky one. Although the policy election is slow, the robot is responsive as the policies themselves run at 50 Hz.

Figure 9:
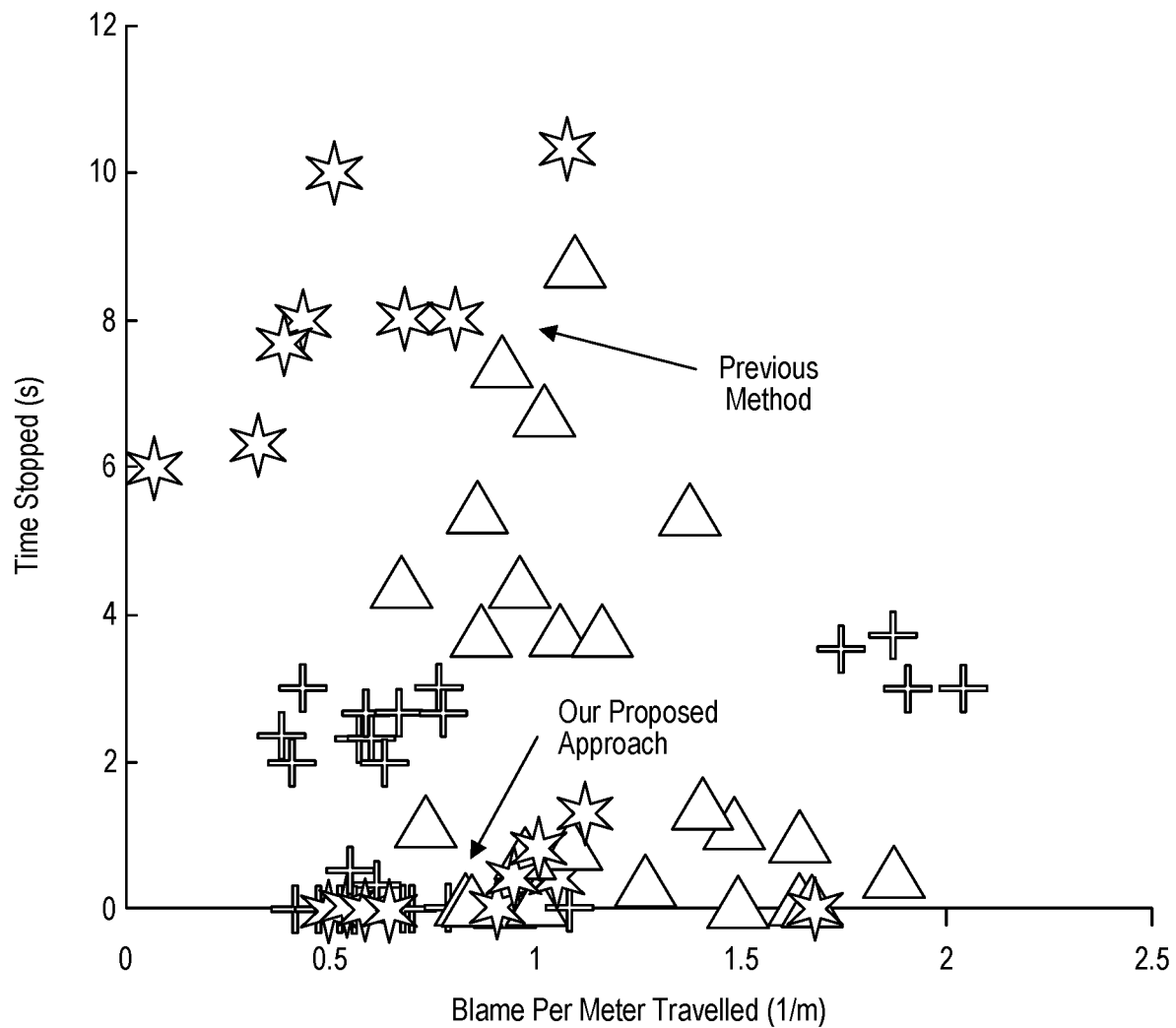
FIG. 9 is a graph depicting real-work data from three repeatable experiments. Real-world data was collected from three repeatable experiments represented by different symbols 1) pedestrians crossing orthogonal to the robot's trajectory (+), 2) pedestrians crossing the robot's path obliquely at 45 degrees (Δ) and 3) pedestrians walking slowly in front of the robot (star). Measure the Time Stopped for every goal reached as well as the Blame per meter traveled by the robot accumulated by inconveniencing pedestrians. Lower the Time Stopped and Blame, the better. The proposed approach (green) can evaluate more policies in real-time than earlier possible. With more candidate policies, the robot can find good policies and can navigate safely without stopping unnecessarily.

Seven volunteers were asked to move towards marked points around an open space for 45 minutes. FIG. 9 shows data from 90 minutes of real-world experiments in which volunteers were asked to repeat three fixed scenarios while the robot made its way towards its goal. For both, our proposed approach as well as SGA, each scenario was repeated for 15 minutes. As observed in simulation, SGA was too slow to evaluate the larger policy set reliably and was unsafe to deploy on our robot. Using SGA with two policies (purple), the robot fails to find safe policies and stops often. Our proposed method (green) can reliably evaluate 10 policies in real-time (similar Blame as compared to SGA with just two policies) and as a result, it is more likely to find safe policies (low Time Stopped).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. A method comprising:
   for each policy of a set of policies:
      receiving a set of state estimates comprising: a state estimate for an agent and a state estimate for each of a set of objects;
      perturbing the set of state estimates to generate a set of perturbed state estimates;
      based on the policy, simulating movement of the set of objects and the agent with a set of simulations based on the set of perturbed state estimates; and
      determining a respective score for the policy based on an outcome quantified for the set of simulations;
   selecting a policy from the set of policies based on the respective score; and
   commanding the agent based on the selected policy.

2. The method of claim 1, further comprising, for each policy: with a first set of simulations, simulating movement of the set of environmental objects and the controlled object based on the set of state estimates, wherein the perturbation of the set of state estimates is based on the first set of simulations.

3. The method of claim 2, wherein the set of perturbed state estimates is associated with a set of influential outcomes of the first set of simulations, wherein each of the set of influential outcomes is associated with a set of cost metrics, wherein each of the set of cost metrics has a greater value than a cost metric associated with the set of state estimates.

4. The method of claim 3, wherein the set of influential outcomes is determined with an anytime algorithm.

5. The method of claim 3, wherein the set of influential outcomes is determined with a backpropagation process.

6. The method of claim 1, wherein the set of simulations comprises a series of forward simulations.

7. The method of claim 6, wherein the forward simulations are conducted iteratively over the set of perturbed state estimates based on a gradient computed iteratively over a series of timesteps.

8. The method of claim 1, wherein the score is determined with a cost function which evaluates a Blame metric and a Progress metric, wherein the Progress metric is based on proximity to an agent goal point, wherein the Blame metric is based on agent proximity to objects of the set of object.

9. The method of claim 8, wherein the cost function comprises a linear combination of the Blame metric and the Progress metric.

10. The method of claim 8, wherein the Blame metric is determined as a function of a velocity of the agent and a distance between the agent and an object of the set of objects.

11. The method of claim 8, wherein the score is further determined based on a probability of the perturbed state estimates.

12. The method of claim 1, wherein the respective score for each policy is determined based on a distance between the agent and a closest object of the set of objects.

13. The method of claim 1, wherein the set of simulations comprises repeating a simulation until a predetermined condition is satisfied.

14. The method of claim 13 wherein the predetermined condition is policy-specific.

15. The method of claim 1, wherein the respective score is determined based on multiple outcomes quantified for the set of simulations.

16. The method of claim 1, wherein the agent comprises an autonomous vehicle.

17. The method of claim 1, wherein the set of policies comprises a plurality of policies.

18. The method of claim 17, wherein set of simulations and policy selection are executed in real-time relative to receipt of the set of state estimates.

19. The method of claim 1, wherein the set of objects comprises a plurality of objects in an environment of the agent.

20. The method of claim 1, wherein commanding the agent comprises commanding the agent to traverse through the environment according to the policy.

* * * * *